No. 628,521. Patented July 11, 1899.
L. W. CAMPBELL.
TOP ROLL.
(Application filed Mar. 19, 1898.)
(No Model.)
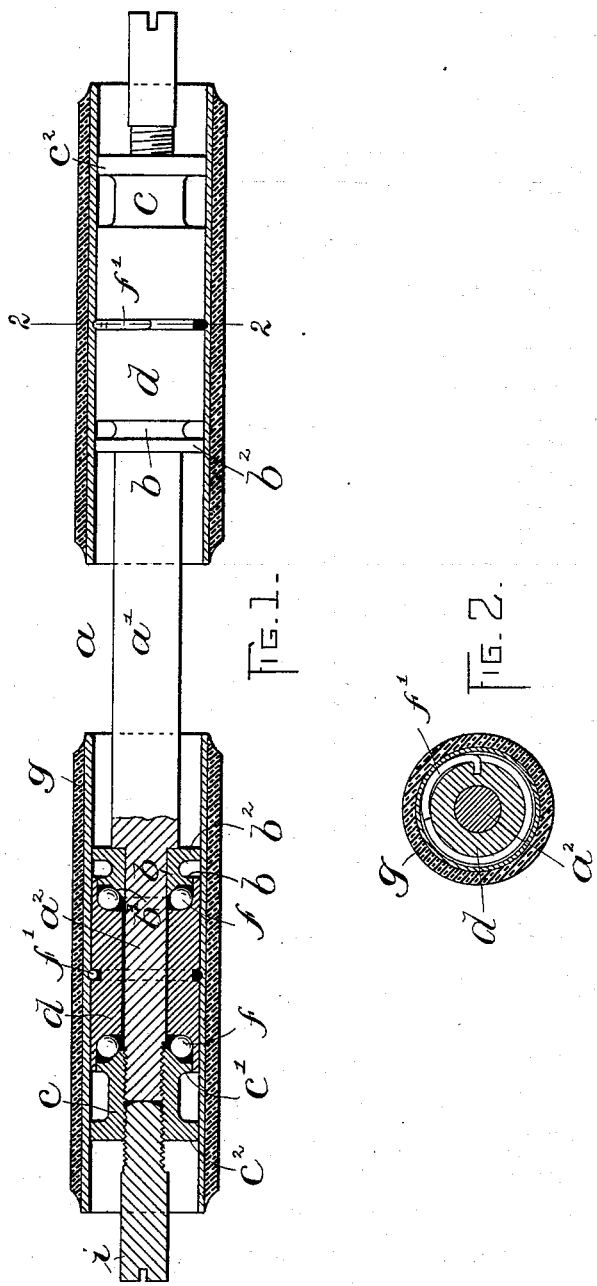
WITNESSES:
A. D. Harrison.
P. W. Pezzetti.
INVENTOR:
Leon W. Campbell
by Wright, Brown & Quinby
Attys.

UNITED STATES PATENT OFFICE.

LEON W. CAMPBELL, OF WOONSOCKET, RHODE ISLAND, ASSIGNOR OF ONE-HALF TO MALCOLM CAMPBELL, OF BOSTON, MASSACHUSETTS.

TOP ROLL.

SPECIFICATION forming part of Letters Patent No. 628,521, dated July 11, 1899.

Application filed March 19, 1898. Serial No. 674,409. (No model.)

*To all whom it may concern:*

Be it known that I, LEON W. CAMPBELL, of Woonsocket, in the county of Providence and State of Rhode Island, have invented certain new and useful Improvements in Top Rolls, of which the following is a specification.

This invention relates to top rolls such as are illustrated and described in my Patent No. 578,705, dated March 9, 1897, which are used in spinning-machines, drawing-frames, mules, speeders, and other like machines; and it has for its object to provide certain improvements in the same whereby the shell may be put in place or removed with greater facility and whereby the bearings may be better protected from dust, cotton, and lint.

The invention therefore consists of a top roll provided with certain features of improvement which I have illustrated upon the drawings and which I shall now describe in detail, and point out with particularity in the claims.

Reference is to be had to the accompanying drawings, and to the letters marked thereon, forming a part of this specification, the same letters designating the same parts or features, as the case may be, wherever they occur.

Of the drawings, Figure 1 represents in longitudinal section a top roll embodying the present invention. Fig. 2 represents a section on the line 2 2 of Fig. 1.

Referring to the drawings, $a$ represents the main arbor or bearing, upon which the pressure of the holding-down weights is applied through the usual saddles, it having an enlarged central portion $a'$ and reduced spindles $a^2$ at the ends. On the inner end of each spindle is placed a collar $b$, having a frusto-conical ball-track $b^3$ and two separated shoulders or flanges $b'$ $b^2$, the latter, $b^2$, of which is of greater diameter than the former, $b'$. At the outer end of each spindle is threaded a similar oppositely-arranged collar $c$, having a conical ball-track and two shoulders $c'$ $c^2$. The collar $c$ is threaded on the extreme end of the spindle, which projects but part way therethrough, and in order to lock the collar against turning after the collars have been adjusted a conically-pointed screw $i$ is passed through its end and bears against the end of the spindle. The sleeve $d$, on which is placed the shell $g$, is counterbored at each end to provide a cup or raceway for the balls $f$, placed between the sleeve and the tracks on the collars $b$ and $c$. The ends of the sleeves are counterbored to such an extent that the collars extend into the ends thereof, whereby the flanges $b'$ $c'$ fit snugly in the said ends and form dust-guards to prevent dust and lint reaching the balls. At its center each sleeve is preferably grooved to receive an arched spring-wire $f$, which has its end secured in an aperture in the sleeve. By reason of the wire being arched it is eccentric of the shell, so that by internally grooving the shell $g$ the wire slips into the groove thereof and detachably holds the shell on the sleeve, and owing to the end of the wire being held in an aperture in the sleeve the wire cannot rotate on the sleeve and wear the groove. Hence all wear produced by the presence of the wire is confined to the groove in the shell, which is more readily and more cheaply replaced when worn than the sleeve. The shell is covered with leather in the ordinary way, and it rotates freely with the sleeve, to which it is thus detachably secured.

The shoulders $b^2$ $c^2$ of the collars fit snugly in the ends of the shell after it is secured in place, so that an additional dust-guard is provided. By this means, even though lint and dust should get by the first guard, they would not pass the second one, so as to interfere with the balls.

The spring-catch furnishes a simple latch for connecting the shell and the sleeve, and it will be seen that the sleeve may be readily detached by drawing longitudinally upon it.

Having thus explained the nature of the invention and described a way of constructing and using the same, though without attempting to set forth all of the forms in which it may be made or all of the modes of its use, I declare that what I claim is—

1. A top roll comprising a central bearing, a sleeve, antifriction devices interposed between the sleeve and the central bearing, a detachable shell adapted to be secured to the sleeve, and a latch for connecting the sleeve to the shell, consisting of an arched spring lying in a groove in one of the said last-mentioned parts and adapted to spring into a groove in the other of said parts, said spring being secured against rotation relatively to the sleeve.

2. A top roll comprising a central bearing having a reduced non-rotary spindle, oppositely-arranged collars on said reduced spindle, the outer collar being screwed on said spindle, a revoluble sleeve surrounding said spindle, and having ball-tracks in its ends, a shell on said sleeve and projecting at the ends beyond said sleeve, balls between the shell and the collars, and a screw threaded into the outer end of the said outer collar and bearing against the end of the said spindle.

3. In a top roll, the combination with a threaded spindle, of a bearing-collar non-rotary threaded partially on said spindle, a screw threaded through said collar and having its end abutting against the end of the spindle, a complemental bearing coacting with said collar, and a shell mounted on said bearings.

In testimony whereof I affix my signature in presence of two witnesses.

LEON W. CAMPBELL.

Witnesses:
ERWIN J. FRANCE,
M. CAMPBELL.